F. T. COOK.
DRILL ATTACHMENT.
APPLICATION FILED MAY 2, 1914.
1,105,406.
Patented July 28, 1914.
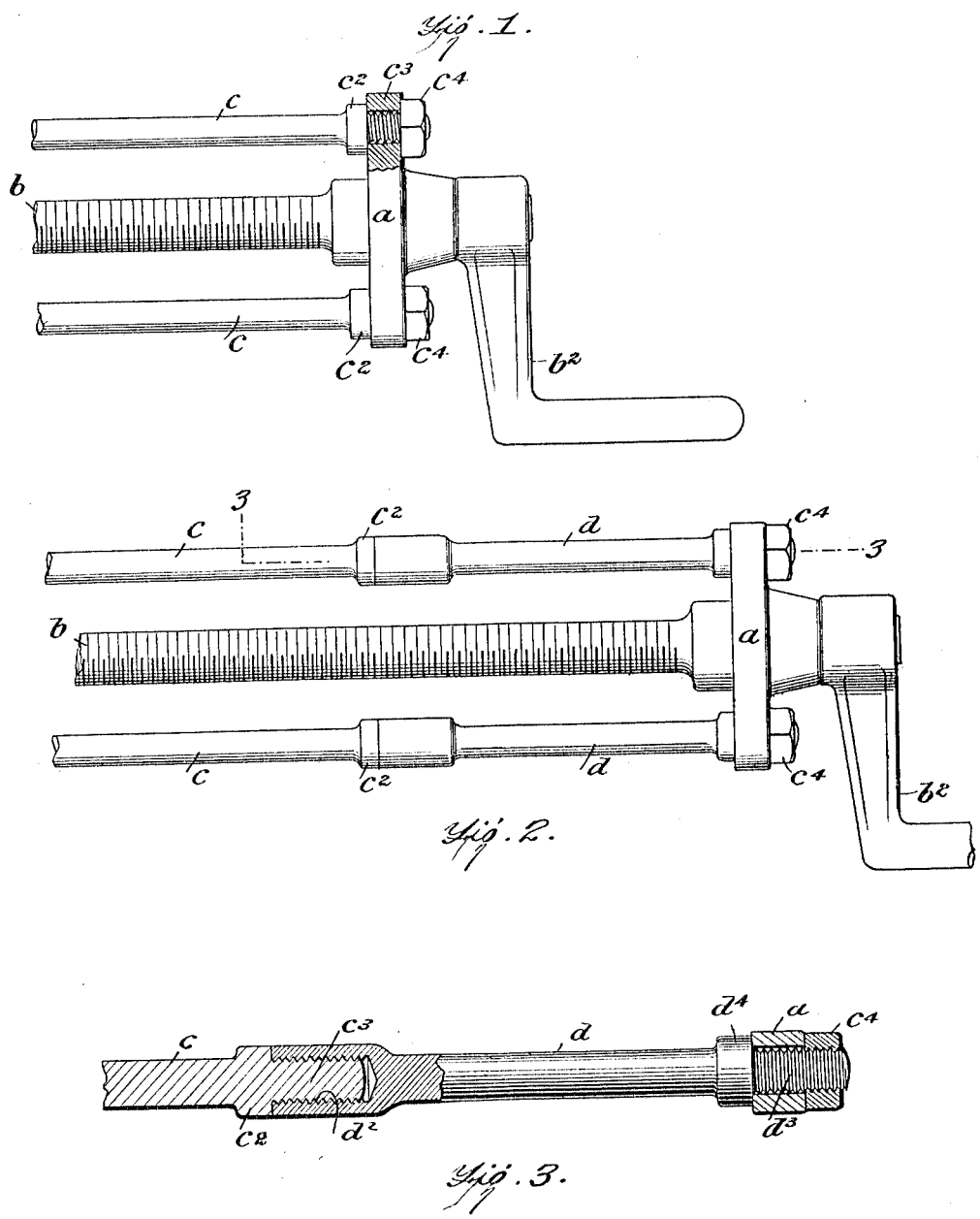
WITNESSES
INVENTOR
FRANK T. COOK,
BY
ATTORNEYS

UNITED STATES PATENT OFFICE.

FRANK T. COOK, OF MIAMI, OKLAHOMA.

DRILL ATTACHMENT.

1,105,406.
Specification of Letters Patent.
Patented July 28, 1914.

Application filed May 2, 1914. Serial No. 835,863.

*To all whom it may concern:*

Be it known that I, FRANK T. COOK, a citizen of the United States of America, and residing at Miami, in the county of Ottawa and State of Oklahoma, have invented certain new and useful Improvements in Drill Attachments, of which the following is a specification, such as will enable those skilled in the art to which it appertains to make and use the same.

My invention relates to mining drills, and the object thereof is to provide means for withdrawing a drill from a drill hole in the event of its becoming stuck therein, and irrespective of the length of the drill or the depth of the hole, with very little trouble or waste of time.

It is well known that drill bits, as used in power driven drilling machines, often become "mucked" or stuck in the hole by the accumulation of fine rock cuttings, mixed with water, and forming a "muck" or hard thick clay around the reduced shank of the drill, just behind the head or cutting end, the continued pounding of the drill packing this "muck" so hard that it is impossible to withdraw the drill from the hole by hand, and it can only be withdrawn by means of the feed screw of the machine, but the length of the said feed screw is frequently insufficient to withdraw the drill because of the length of the drill and the depth of the hole. In withdrawing a drill of less length than the feed screw all that is necessary is to reverse the direction of movement of the latter, a crank being provided for this purpose, and two side rods are also provided at the sides of the said screw to serve as a brace for such drill withdrawal but, when the drill exceeds the operative length of the feed screw, and of these side rods, the drill cannot be withdrawn, by said screw, as will be obvious, and it was in order to overcome this inability that my present invention was conceived.

My invention is fully described in the following specification, of which the accompanying drawings form a part, in which the same reference characters are used to designate the same parts in each of the views, and in which:—

Figure 1 is a fragmentary showing, partly in cross-section, of the conventional feed screw, crank, crosshead, and side bars, neither the drill, or machine being shown as they may be of any desired construction and form no part of this invention; Fig. 2 is a fragmentary view but showing my invention in operative position; and Fig. 3 is an enlarged, fragmentary, section taken on the line 3—3 of Fig. 2.

In the drawings forming a part of this application I have shown a crosshead $a$ in which is revolubly mounted a feed screw $b$ operable by means of a crank $b^2$, and on each side of said feed screw is a rod $c$ arranged in parallelism therewith, said side rods being provided, each, with a shoulder $c^2$ and a threaded end $c^3$ adapted to be passed through suitable holes in the crosshead and be secured in such position by nuts $c^4$, this all being of conventional form.

In machines of this type the drill is arranged in a carriage slidably arranged on a fixed portion of the said machine, the feed screw being in engagement with said carriage and the side rods with said fixed portion whereby said carriage and drill are positively moved with respect to said fixed portion of the machine, either outwardly to feed or inwardly to withdraw the drill but, if the drill be of greater relative length than the feed screw, only a partial withdrawal of said drill is possible by means of the feed screw, and very often not sufficiently far to pass the "muck". In order to overcome this possibility I provide extension rods $d$, of lengths to suit the conditions but both of the same length, and said extension rods are provided, each, with a threaded recess $d^2$ adapted to receive the threaded end $c^3$ of the rods $c$, said rods $d$ being provided, at the opposite ends, each, with an externally threaded portion $d^3$ adapted for engagement with the crosshead and with the nuts $c^4$, and with a shoulder $d^4$.

In practice, when a drill becomes "mucked", or stuck in a drill hole, it is first withdrawn to the capacity of the feed screw by turning the crank $b^2$ in a corresponding direction, after which the nuts $c^4$ are removed from the conventional side rods $c$ and the crank $b^2$ is then revolved reversely to permit the crosshead $a$ to move away from the side bars $c$ to a distance therefrom sufficiently far to admit the extension rods $d$ over the ends of the rods $c$ and upon which they are firmly screwed and, when so secured, the crank is again turned in the first named direction to permit the crosshead to become firmly seated against the shoulders $d^4$ of the extension rods $d$, the threaded ends $d^3$ of said rods being passed through the corresponding holes in the crosshead, after which the nuts $c^4$ are firmly screwed on the ends $d^3$ of the extension rods $d$ and an additional withdrawal of the drill is possible by means of the feed screw in the ratio of the length of the extension rods $d$, and this operation may be repeated with supplemental extension rods or longer extension rods may be substituted for those previously used, said extension rods, of whatever length, being provided with a male and a female threaded end of the same diameter and pitch whereby they will not alone fit each other, but also the conventional rods $c$ and the nuts $c^4$. It will thus be seen that drills may be withdrawn from the "muck" regardless of the length of the drills or of the extent of the "muck", by means of the feed screw $b$ without trouble or loss of time and, while I have shown a present preferred form of the extension rods $d$, it will be obvious that I am not limited thereto, nor to the lengths thereof, nor to other details, and, with a reservation to myself of all changes in and modifications of the form shown and described as will come within the scope of the following claims,

What I claim as new, and desire to secure by Letters Patent, is:—

1. In a drilling machine having a feed screw, a crosshead for supporting the same and brace rods for said crosshead; an extension rod adapted for insertion between each brace rod and said crosshead, and means for securing it to each.

2. In a drilling machine having a feed screw, a crosshead for supporting the same and brace rods for said crosshead; an extension rod provided with a male threaded end for engagement with said crosshead and with a female threaded end for engagement with each of said brace rods and adapted for insertion between said crosshead and said brace rods.

3. In a drilling machine having a feed screw, a crosshead for supporting the same, brace rods for said crosshead, and nuts for securing said brace rods to said crosshead; an extension rod for each of said brace rods having a male threaded end to fit a corresponding nut to secure the same to said crosshead, and a female threaded end to fit the end of a corresponding brace rod.

4. In a drilling machine having a feed screw, a crosshead for supporting the same, brace rods for said cross-head, and nuts for securing said brace rods to said crosshead, said brace rods having reduced threaded ends for engagement with said nuts; an extension rod for each of said brace rods having a reduced, externally threaded, end of the same diameter and pitch as the reduced ends of said brace rods and adapted for engagement with said nuts when removed from said brace rods to lock the same to said crosshead, and said extension rods having, each, an internally threaded end for engagement with the reduced, threaded, end of a corresponding brace rod.

In testimony that I claim the foregoing as my invention I have signed my name in presence of the subscribing witnesses this 27th day of April, 1914.

FRANK T. COOK.

Witnesses:
GEO. E. BANFORD,
CHAS. L. HALE.

Copies of this patent may be obtained for five cents each, by addressing the "Commissioner of Patents, Washington, D. C."